Patented Nov. 4, 1930

1,780,315

UNITED STATES PATENT OFFICE

OTTO C. SCHMIDT, OF SHARPSBURG, PENNSYLVANIA

GREASE

No Drawing.  Application filed November 17, 1928.  Serial No. 320,212.

My invention relates to lubricating compounds, and more particularly to grease in solid form for lubricating the bearings of heavier machinery, such as the roll necks and their bearings in cold roll steel mills, but the compound is of course suitable for use in various other ways.

One object of my invention is to provide a lubricant that is particularly suitable for use in water-cooled bearings and which will not become washed away by the water, but which will nevertheless melt at a sufficient rate to adequately lubricate the bearings.

Another object of my invention is to provide a lubricating compound of generally improved qualities.

Still another object of my invention is to provide a lubricating compound that is relatively inexpensive and which is also adequate as a lubricant.

In its preferred form, my compound contains the following ingredients.

95 parts paraffin wax.
11 parts petroleum oil, such as black oil or engine oil.
25 parts rosin.
20 parts sheep wool grease (degras).
35 parts lime, preferably air slacked.
50 parts white clay or soapstone.
9 parts sal soda.

In preparing the compound, I first mix the wax with the oil and rosin, heat it to the melting point, and then stir its thoroughly. Thereafter, the other ingredients are added while the preliminary mixture is still warm, and the whole stirred. The mixture is then boiled until it hardens. If desired, a smaller quantity of sal soda may be employed and water substituted therefor to effect boiling out of the acid from the wax.

An important feature of my invention resides in the inclusion of the black oil in the mixture, which facilitates the intermingling of the wool grease with the wax. Heretofore, difficulty has been experienced in mixing wool grease with paraffin wax, owing to the tendency of such materials to stratify when used in conjunction with one another.

After boiling of the mixture, it is permitted to cool and become hardened, whereupon it may be cut up into lumps or poured into moulds and the solid pieces thus formed are ready for use upon roll necks or any other types of bearings.

I have found that while such a mixture will melt at the relatively low temperatures permitted in the roll necks, it is of such viscosity that it will not be washed away by the water which is usually supplied to the roll necks for the purpose of keeping them from becoming overheated.

It will be understood that the operations above recited may be varied, according to the character of surface for which the lubricant is intended, and according to the consistency desired for the finished product.

I claim as my invention:—

1. A lubricating compound containing paraffin wax, petroleum oil, rosin, sheep wool grease, lime, soapstone, and sal soda.

2. A lubricating compound composed of 95 parts paraffin wax, 11 parts petroleum oil, such as black oil or engine oil, 25 parts rosin, 20 parts sheep wool (degras), 35 parts lime, 50 parts soapstone and 9 parts sal soda.

3. A lubricating compound containing paraffin wax, petroleum oil and sheep wool grease.

4. A lubricating compound formed by mixing paraffin wax, petroleum oil and rosin at their melting points, and added ingredients, including lime, soapstone and soda.

In testimony whereof I, the said OTTO C. SCHMIDT, have hereunto set my hand.

OTTO C. SCHMIDT.